(12) United States Patent
Han

(10) Patent No.: US 7,564,406 B2
(45) Date of Patent: Jul. 21, 2009

(54) METHOD AND APPARATUS IN STANDALONE POSITIONING WITHOUT BROADCAST EPHEMERIS

(75) Inventor: Shaowei Han, Palo Alto, CA (US)

(73) Assignee: SiRF Technology, Inc., San Jose, CA (US)

(*) Notice: Subject to any disclaimer, the term of this patent is extended or adjusted under 35 U.S.C. 154(b) by 0 days.

(21) Appl. No.: 11/558,614

(22) Filed: Nov. 10, 2006

(65) Prior Publication Data

US 2008/0111738 A1    May 15, 2008

(51) Int. Cl.
*G01S 1/00* (2006.01)
(52) U.S. Cl. .................................. 342/357.12
(58) Field of Classification Search .................
342/357.01–357.17
See application file for complete search history.

(56) References Cited

U.S. PATENT DOCUMENTS

| | | | |
|---|---|---|---|
| 6,437,734 B1 | 8/2002 | McBurney | |
| 6,542,820 B2 | 4/2003 | LaMance | |
| 7,092,964 B1* | 8/2006 | Dougherty et al. | 707/104.1 |
| 7,142,157 B2 | 11/2006 | Garin | |
| 2003/0169201 A1* | 9/2003 | Dybdal et al. | 342/367 |
| 2005/0140545 A1* | 6/2005 | Subbarao et al. | 342/357.12 |
| 2005/0234644 A1* | 10/2005 | Lin | 701/214 |
| 2006/0129317 A1* | 6/2006 | Farmer et al. | 701/213 |
| 2006/0161379 A1* | 7/2006 | Ellenby et al. | 702/150 |
| 2006/0195262 A1* | 8/2006 | Draganov | 701/214 |

* cited by examiner

*Primary Examiner*—Thomas H Tarcza
*Assistant Examiner*—Harry Liu
(74) *Attorney, Agent, or Firm*—Haynes & Boone, LLP.

(57) ABSTRACT

The present invention provides methods and system for enabling a standalone navigation receiver capable of generating receiver specific predicted satellite orbits based on historical navigation data collected by and stored in the receiver. Thus, the navigation receiver is able to use the predicted satellite orbits to obtain better Time-To-First-Fix (TTFF) and position accuracy without the need of connecting to a remote server and the associated communications system. In an embodiment, a standalone navigation receiver having sufficient memory collects navigation data from navigation satellites and generates predicted satellite orbits using the collected navigation data. Under weak signal conditions when decoding of the navigation data is not possible, the receiver uses the predicted satellite orbits to predict the accurate satellite positions or the set of ephemeris and the associated pseudoranges. The predicted orbits may be accurate for several days without the reception of broadcast ephemeris.

22 Claims, 4 Drawing Sheets

A GPS baseband hardware

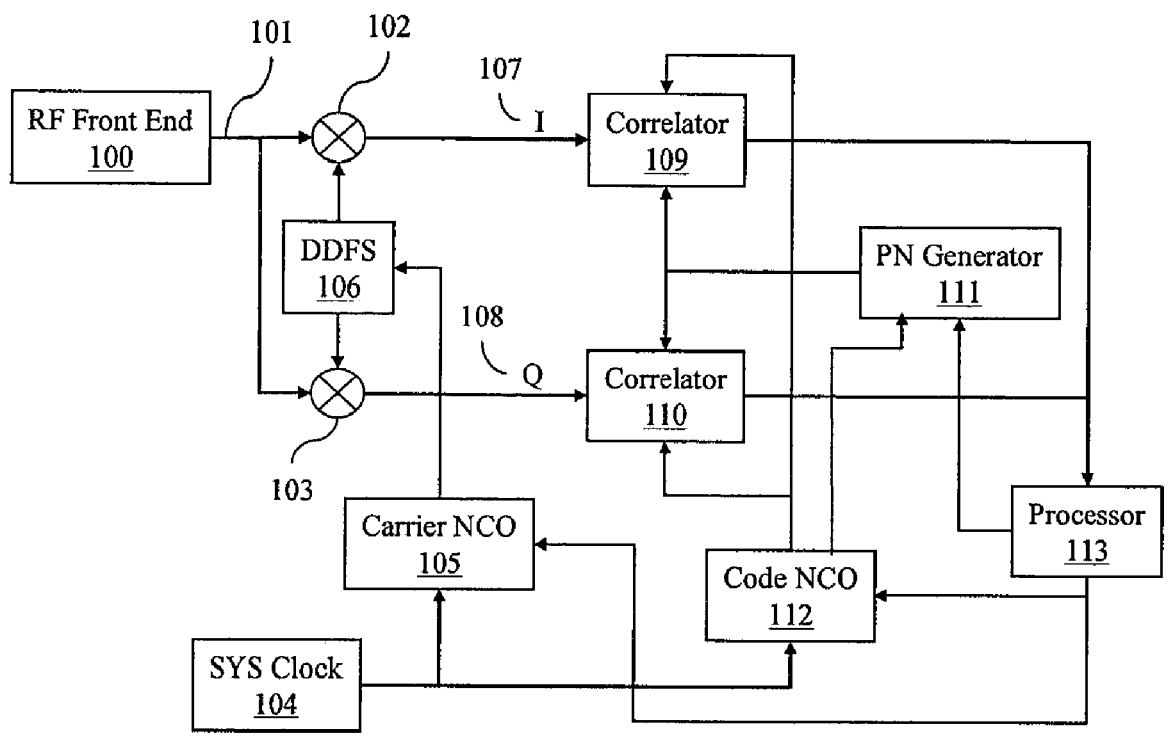
FIG. 1 A GPS baseband hardware

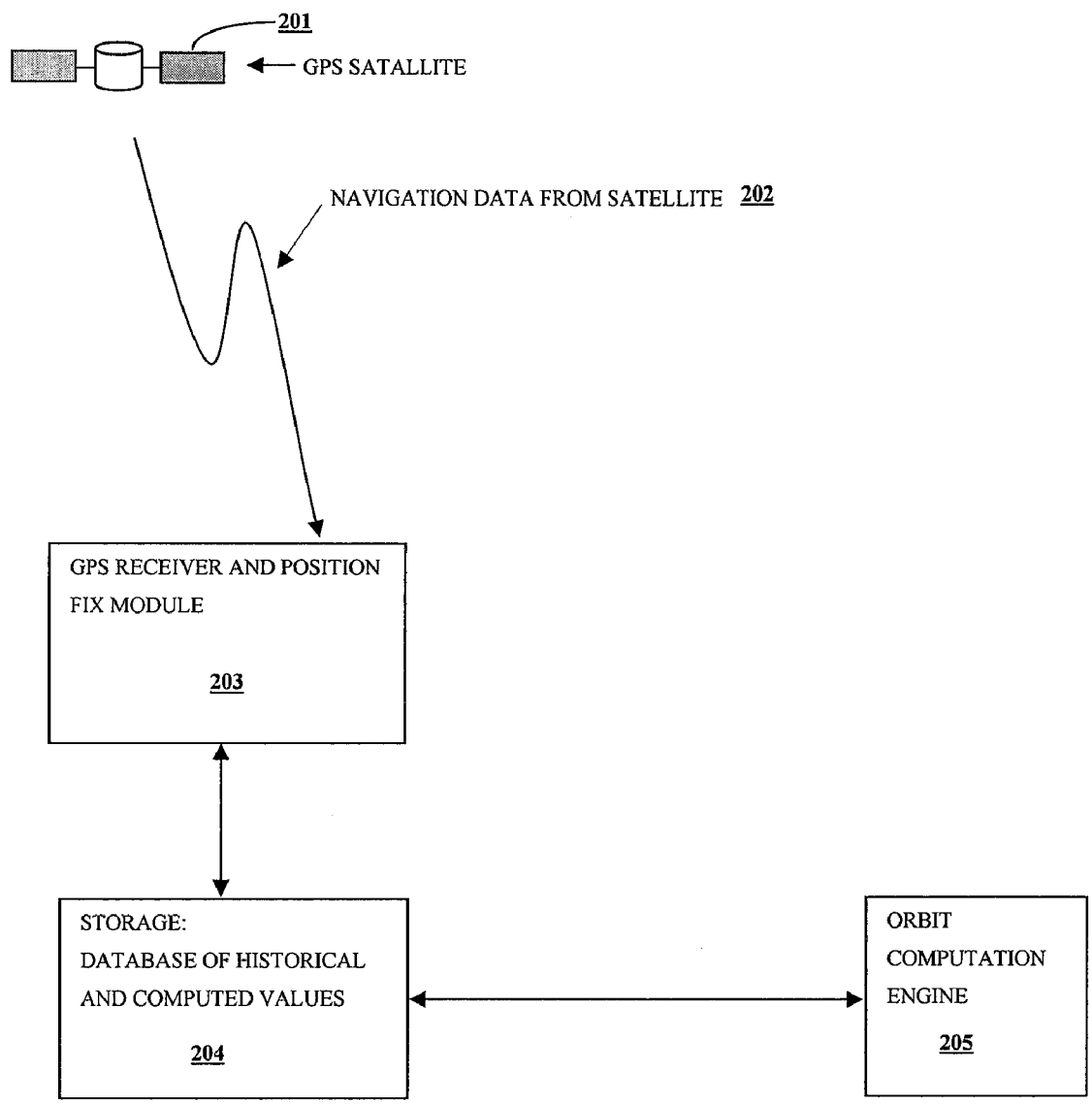
FIG 2. NAVIGATION RECEIVER SYSTEM

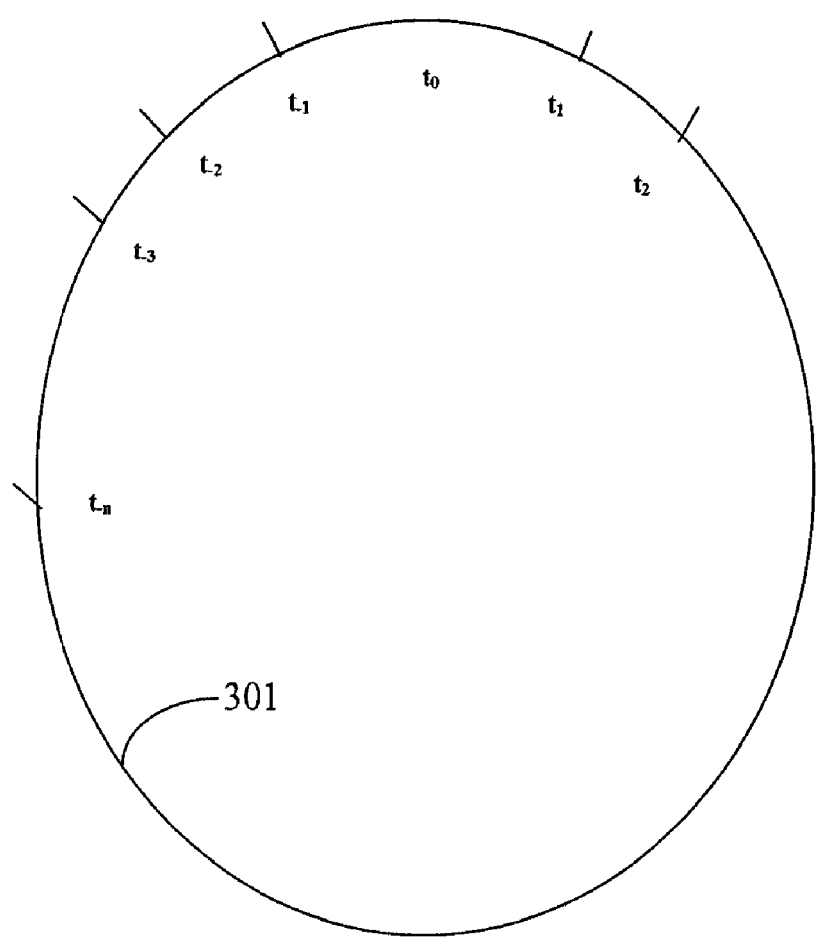
FIG 3. A GPS SATELLITE ORBIT WITH TIME STAMPS

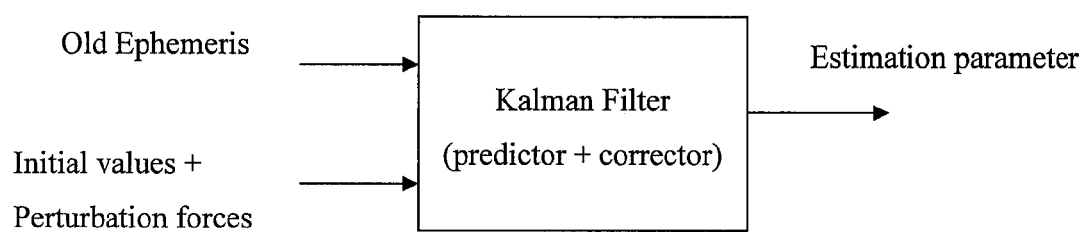
FIG 4   KALMAN FILTER FOR ESTIMATION PARAMETER

METHOD AND APPARATUS IN STANDALONE POSITIONING WITHOUT BROADCAST EPHEMERIS

FIELD OF THE INVENTION

The present invention relates generally to navigational receivers, and more particularly to systems and methods that enable standalone navigation receivers to determine their position without the immediate need of broadcast ephemeris.

BACKGROUND OF THE INVENTION

With the development of radio and space technologies, several satellite-based navigation systems have already been built and more will be in use in the near future. One example of such satellite-based navigation systems is the Global Positioning System (GPS), which is built and operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

Coherent integration and noncoherent integration are two commonly used integration methods to acquire GPS signals. Coherent integration provides better signal gain at the cost of larger computational load, for equal integration times.

The signals from the navigational satellites are modulated with navigational data at 50 bits/second. This data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word are telemetry bits and are not used in the position computation. The second word of any frame is the HOW (Hand Over Word) word and consists of the TOW (Time Of Week), sub-frame ID, synchronization flag and parity with the last two bits of parity always being '0's. These two '0' s help in identifying the correct polarity of the navigation data bits. The words 3 to 10 of the first sub-frame contains clock correction coefficients and satellite quality indicators. The 3 to 10 words of the sub-frames 2 and 3 contain ephemeris. The ephemeris is used to precisely determine the position of the GPS satellites. The ephemeris is uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames.

The super frame contains twenty five consecutive frames. While the contents of the sub-frames 1, 2 and 3 repeat in every frame of a superframe except the TOW and an occasional change of ephemeris every two hours. Thus the ephemeris of a particular signal from a satellite contains only the ephemeris of that satellite repeating in every sub-frame. However, almanacs of different satellites are broadcast in-turn in different frames of the navigation data signal of a given satellite. Thus the 25 frames transmit the almanac of all the 24 satellites in the sub-frame 5. Any additional spare satellite almanac is included in the sub-frame 4.

The almanacs and ephemeris are used in the computation of the position of the satellites at a given time. The almanacs are valid for a longer period of six days but provide a less accurate satellite position and Doppler compared to ephemeris. Therefore almanacs are not used when fast position fix is required. On the other hand, the accuracy of the computed receiver position depends upon the accuracy of the satellite positions which in-turn depends upon the age of the ephemeris. The use of current ephemeris results in better position estimation than one based on non-current or obsolete ephemeris. Therefore it is necessary to use current ephemeris to get a precise satellite position and hence the receiver position.

A GPS receiver may acquire the signals and estimate the position depending upon the already available information. In the 'hot start' mode the receiver has current ephemeris and the position and time are known. In another mode known as 'warm start' the receiver has non-current ephemeris but the initial position and time are known as accurately as in the case of previous 'hot start'. In the third mode, known as 'cold start', the receiver has no knowledge of position, time or ephemeris. As expected the 'hot start' mode results in low Time-To-First-Fix (TTFF) while the 'warm start' mode which has non-current ephemeris may use that ephemeris or the almanac resulting in longer TTFF due to the less accurate Doppler estimation or time required to download the new ephemeris. The 'cold start' takes still more time for the first position fix as there is no data available to aid signal acquisition and position fix.

It is not always possible to maintain a copy of current ephemeris in the receiver. This may be due to the fact that the receiver had no opportunity to download the ephemeris as it might have been powered off for a duration longer than four hours or because the received signal is very weak. There are US patents directed to providing assistance in fast position fix. Most of these patents deal with providing the ephemeris to the receiver through a wireless or wireline means. However, the ephemeris are valid over a limited period and is therefore of no use when a longer validity of the ephemeris expected. Some US patents and published US patent applications disclose methods of extending the validity of the ephemeris or orbit data. U.S. Pat. No. 6,437,734 discloses the transfer of navigation information from a sever to the GPS receiver using a polynomial method. This transfer is accomplished through the Internet. U.S. Pat. No. 6,542,820 discloses a method of extrapolating the ephemeris based on the historical tracking data or ephemeris. However, the extrapolation of the ephemeris is done at a server and the sets of predicted satellite orbit parameters valid for several days are sent to the navigation receiver from the server. Published U.S. patent application 2006/0055598 also discloses a similar method. The problem with these methods is that they require a central GPS receiver platform to collect historical navigation data and a server and communications system to predict and transfer the satellite orbit data to the intended navigation receiver.

Therefore, there is a need for a standalone navigation receiver that is capable of generating its own predicted satellite orbits without the need of connecting to a remote server and the associated communications system.

SUMMARY

Accordingly, the present invention provides methods and system for enabling a standalone navigation receiver capable of generating receiver specific predicted satellite orbits based on historical navigation data collected by and stored in the receiver. Thus, the navigation receiver is able to use predicted satellite orbits to obtain better TTFF and position accuracy without the need of connecting the receiver to a remote server and the associated communications system.

In an embodiment, a standalone navigation receiver having sufficient memory collects navigation data from navigation satellites whenever the receiver is tracking signals from the navigation satellites. The collected navigation data may include ephemeris. The receiver generates predicted satellite orbits using the collected navigation data. Under weak signal conditions when decoding of the navigation data is not possible, the receiver uses the predicted satellite orbits to predict the accurate satellite positions or the set of ephemeris and the associated pseudoranges. The predicted orbits may be accurate for several days without the reception of broadcast ephemeris.

The above and other advantages of embodiments of this invention will be apparent from the following more detailed description when taken in conjunction with the accompanying drawings.

BRIEF DESCRIPTION OF THE DRAWINGS

FIG. 1 is a block diagram illustrating a GPS receiver according to an embodiment of the present invention.

FIG. 2 illustrates a receiver system according to an embodiment of the present invention.

FIG. 3 shows an exemplary satellite orbit with time stamps indicating the satellite's position at the respective time stamps.

FIG. 4 shows an exemplary Kalman filter for generating estimating parameters according to an embodiment of the invention.

DETAILED DESCRIPTION

FIG. 1 illustrates a receiver according to a preferred embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

A DSP core of processor 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times.

A GPS receiver uses the down-loaded ephemeris to accurately compute the position of the visible satellites. Based on these satellite positions, the position of the receiver is estimated. This computed position is more accurate if the ephemeris used is current. In the case of GPS the ephemeris is updated every two hours even though the ephemeris is valid for a period of four to six hours. If ephemeris is used beyond this period of four to six hours, it causes an offset in pseudorange where the pseudorange is the estimated distance of the satellite from the receiver with no corrections applied for the receiver clock drift, atmospheric delay, etc. In addition to the shift in the position, the estimated values of Doppler and Doppler rate are also not accurate with non-current ephemeris and result in a longer search time with a longer Time-To-First-Fix (TTFF). Thus, it is always necessary to download and use current ephemeris to minimize this position error and the TTFF. However, it is not always possible to have current ephemeris in the memory of the GPS receiver. One example is the case of a morning commute to the office where the GPS receiver is powered off for the remainder of the day and is not powered on again until the evening for the commute back home. The time gap in this case is more than four hours and the ephemeris becomes non-current. Use of this non-current ephemeris not only increases the TTFF but also results in position estimation with a shift and therefore a proper vehicle navigation can not be initiated. Further, there is considerable delay if one opts for new ephemeris download from each of the satellites involved. This download may require eighteen seconds or more for each satellite after the start of the signal tracking process. Further, the broadcast ephemeris need to be separately downloaded from each of the visible satellite.

To overcome the above problems associated with non-current ephemeris, the present invention provides techniques to generate sets of more precise ephemeris that are valid over a larger time interval, extending over several days. This new set of 'generated ephemeris' can be based on the sets of current and historical broadcast ephemeris and measurements such as pseudoranges collected by and stored at the receiver. In this disclosure, the set of present and historical broadcast ephemeris and measurements will be referred to as historical data. Further, the positioning device or GPS receiver is assumed to have enough memory to store the historical data of interest over a long period. The techniques of the present invention build satellite orbit models to fit the historical data. These models are then used to predict the Satellite Vehicle (SV) orbit and simultaneously generate the predicted ephemeris.

The historical data collection need not be carried out continuously over a long time interval. On the other hand, data collection preferably takes place whenever the receiver is in navigation mode. Thus collection preferably occurs at regular intervals of, e.g., once at a fixed time instance in every two hours. Alternatively, the collection may also be at the end of the present two hour interval and continue at the start of the next interval of new broadcast ephemeris. The broadcast ephemeris values are not stored whenever reception conditions do not allow proper downloading. In that case, the orbit model is built with available stored historical data.

In addition to the downloaded navigation data, some computed values such as pseudorange are stored in the database. These measured values reduce the computational load in the orbit determination.

FIG. 2 shows a navigation receiver system according to an embodiment comprising three modules: a local navigation database 204, an orbit computation engine 205 and a position fix 203 modules. The first module 204 is a local navigation database of current and historical navigation information. The navigation information is obtained by signal observations and computed results. The signal observations are the data transmitted by the satellites which include the ephemeris, almanac, time and corrections to position and time for each of the satellites. The computed results include various satellite perturbation forces, satellite initial parameters such as mass, direction of motion etc., UTC and GPS time, and pseudoranges. The ideal satellite orbit will be modified by the perturbation forces. The navigation receiver receives navigation data such as ephemeris, almanac, timing information and some correction data shown as 202 from the GPS satellites 201. Block 203 is the GPS signal receiver and position fix device which is the normally used form of the GPS receiver.

Block 204 is the storage or database of the prior and current navigation data including manually input parameters such as masses of the earth, moon and planets, coefficients for relativistic effects, gravitational forces, etc. Block 205 is the orbit computation module which provides the needed computation capability for orbit determination.

The second module 205 is the satellite orbit computation module. This comprises the mathematical modules for generating the perturbation forces experienced by the navigation satellites, estimation of initial condition parameters and selected perturbation force parameters using the historical data, and calculation and extrapolation of the orbit coordinates with accuracy information. The orbit computation module may be implemented in software stored in memory on the receiver and executed by a processor of the receiver.

Because of perturbation forces the orbit deviates from the ideal orbit. The forces are due to the effects of the gravitational field of the sun, moon and other planets including the earth. In addition to these forces there also exist other forces such as non-spherical force due to earth shape, earth tide, sun radiation pressure, relativity effect and atmospheric drag. All of these factors may be taken into consideration when the satellite orbit is predicted. Available present day techniques may be used to compute these forces.

With a standalone GPS receiver, the available information is the broadcast ephemeris collected in the past and stored in the local navigation database of the receiver. In order to predict the satellite orbit at time $t_m$ from the last available broadcast ephemeris at a time $t_0$, the following information may be prepared:

The transformation between the Earth Centered Earth Fixed (ECEF) coordinates u and the Earth Centered Inertial (J2000) coordinates x:

$$x = WRNP \cdot u$$

The polar motion (W), earth roation (R), nutation (N) and precession (P) may be assumed to be known within the coming several years, in which case they do not need to be estimated in the mathematical modeling.

The forces on the satellite can be classified into two categories. One category ($\ddot{x}_{model}$) can be modeled with enough accuracy and the other category ($\ddot{x}_{estimate}$) needs to be estimated based on historical data. The total forces can be represented as:

$$x(t_m) = x(t_0) + \int_{t_0}^{t_m} (\int_{t_0}^{t} \ddot{x}(t) dt + \dot{x}(t_0)) dt$$

where $x(t_m)$ and $x(t_0)$ are the satellite coordinates at times $t_m$ and $t_0$, respectively, $\ddot{x}(t)$ represents total forces as a function of time and $\dot{x}(t_0)$ represents velocity at time $t_0$.

The satellite coordinates in ECEF can be transformed from J2000:

$$u = (WRNP)^{-1} \cdot x$$

The next step is to estimate the parameters ($\beta$) for the forces in $\ddot{x}_{estimate}$ and satellite initial position $x(t_0)$ and velocity $\dot{x}(t_0)$.

The information from a standalone GPS receiver system provides historical broadcast ephemeris at $t_0, t_{-1}, \ldots, t_{-n}$, and the mathematical model can be built as follows:

$$x(t_{-n}) = x(t_0) + \int_{t_0}^{t_{-n}} (\int_{t_0}^{t} (\ddot{x}_{model}(t) + \ddot{x}_{estimate}(\beta, t)) dt + \dot{x}(t_0)) dt$$

Therefore $x(t_0)$, $\dot{x}(t_0)$ and $\beta$ can be estimated based on the above observation equation. The position $x(t_{-n})$ of the satellite at times $t_{-n}$, can be obtained using historical broadcast ephemeris stored in the receiver.

With the initial satellite status (position $x(t_0)$ and velocity $\dot{x}(t_0)$) and $\beta$ parameters, the satellite orbit can then be predicted with better accuracy.

The historical ephemeris of $x(t_{-n})$ has errors which is dependent on the age of the ephemeris. The other error sources are due to the residual errors from forces modeling which is proportional to the square of the integration time $(t-t_0)$. Based on these errors the weight matrix of the $x(t_{-n})$ can be approximated in Kalman filtering or Least Square estimator.

There are at least two ways to compute the above integration in the receiver. One is the numerical integration using Runge-Kutta methods, Adams-Bashforth method, or any other numerical algorithms; the other way to derive the analytical formula for low order terms and simplify the numerical integration calculation load.

After the discrete satellite positions are predicted, the interpolation algorithms may be used to get satellite position at any time. Interpolation algorithms include Chebyshev polynomial interpolation, Lagrangian polynomial interpolation, or other interpolation methods. The satellite position can also be presented in the format of the satellite broadcast ephemeris which is valid at 4-6 hours. Thus the predicted satellite positions can be formatted into predicted ephemeris, which are valid for several days.

This method is illustrated in FIG. 3 where reference number 301 represents the orbit of the satellite. In FIG. 3, $t_0$ is the current time and BC(0) is the corresponding broadcast ephemeris. The BC(0) may be represented as a sum of a function of satellite position, velocity, solar pressure, etc. and small error in these parameters. This error may be estimated by knowing the broadcast ephemeris during the past time stamps $t_{-1}$, $t_{-2}$, ... $t_{-n}$ where n is the number of the prior ephemeris considered. A Kalman filtering technique or similar technique may be used for estimation.

FIG. 4 shows the inputs and outputs of an exemplary Kalman filter as used in an embodiment of the invention. The Kalman filter includes both the predictor and corrector. The inputs to the Kalman filter are the old or historical ephemeris and the initial values of the estimating parameters including perturbation forces. The Kalman filter uses the initial values of the estimating parameters to predict the satellite position at a past time $t_{-1}$. Based on the difference between the predicted position at $t_{-1}$ and the position at $t_{-1}$ obtained using broadcast ephemeris, the estimating parameters are modified or corrected to reduce the error. The satellite position is then predicted at past time $t_{-2}$ using the modified estimating parameters. Based on the difference between the predicted position at $t_{-2}$ and the position at $t_{-2}$ obtained using broadcast ephemeris, the estimating parameters are further modified or corrected. This process is repeated for a set of historical satellite positions resulting in further refinement of the estimating parameters and better prediction accuracy. The output of the Kalman filter is the modified estimating parameters (position $x(t_0)$, velocity $\dot{x}(t_0)$ and $\beta$ parameters). The calculation or extrapolation of the satellite orbit at future times, etc. $t_1$, $t_2$, etc. may be done using the modified estimating parameters. The estimation error computed by the Kalman filter provides accuracy information for the estimated satellite position.

The second embodiment of the calculation or extrapolation of the orbit is similar to the first embodiment except that analytical formula is used to generate the estimating parameters. A Chebyshev polynomial or Lagrangian polynomial or any other fitting/prediction function may be used to fit the estimating parameters using least square error criteria. These functions optimally fit the historic and predicted ephemeris data to a curve which represents the trajectory or orbit of the satellites.

The satellite clock offset is another parameter that needs to be precisely known for the position fix. The satellite clock offsets with the second order polynomial function is downloaded from the satellite navigation data and stored in the local navigation database. Based on all sets of satellite clock offsets, the satellite clock bias can also be fitted on a polynomial fitting function using least squares estimation algorithm. Thus, values for the satellite clock offsets in the future time can be extrapolated from the sets of satellite clock offsets stored in the local database. Any extrapolation algorithm with second order or higher order fitting functions may be used for the satellite clock offset prediction.

The above predicted satellite orbit may be computed according to a given schedule, e.g., every six hours or whenever the local navigation database is updated. The predicted satellite orbit is then stored in the local navigation database. This orbit is used whenever position is computed in the given interval. It may also be used in the generation of the next time interval orbit prediction if broadcast ephemeris are not available, e.g., during $t_2$. The predicted satellite orbit can itself be in the navigation data format with orbits determined in terms of Eccentricity $e_s$, square root of semi-major axis, correction terms, etc. to generate predicted ephemeris.

In an embodiment, the predicted satellite orbit is computed whenever new ephemeris for the corresponding satellite is downloaded and stored in the local database. This way, the predicted satellite orbit incorporates the latest ephemeris received by the receiver, thereby providing better accuracy. In another embodiment, the receiver uses the most accurate available ephemeris to compute satellite position, e.g., current ephemeris if stored in the local database or predicted ephemeris based on the predicted satellite orbit if current ephemeris is not stored in the local database.

The final module is the position fix module 203. The above predicted ephemeris are used to accurately determine the position of the satellites and hence acquire the satellite signals. A Kalman filtering or least squares estimating algorithm is also used in the position fix module to derive the position from the noisy measurements. The Kalman filter may do this by receiving several consecutive pseudorange measurements to estimate the noise and correcting future measurements by removing this noise or error in the position computation. The Kalman filter takes into account the prior accuracy information of the orbit. Thus the biases in the ephemeris and the clock, which are the errors associated with the ephemeris prediction and with the satellite clock and hence with estimated time, determines the accuracy of the orbit and hence the receiver position. Based on the accuracy of the predicted ephemeris and the clock or time, a quality of position fix is also determined. The quality of position fix may be determined, e.g., by computing how the accuracy of the orbit and time affect the position fix computation. Thus this position fix also determines the associated quality of the position fix.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Accordingly, it is intended that the appended claims be interpreted as covering all alterations and modifications as fall within the spirit and scope of the invention.

What is claimed is:

1. A method for a satellite navigation receiver, comprising:
storing current and historical broadcast ephemeris received from a satellite in a local navigation database on the receiver;
estimating perturbation forces for the satellite from the stored current and historical broadcast ephemeris;
estimating an initial satellite position for the satellite from the stored current and historical broadcast ephemeris and the estimated perturbation forces;
computing predicted ephemeris for the satellite using the estimated perturbation forces and the estimated initial satellite position; and
determining a position for the satellite navigation receiver using the predicted ephemeris.

2. The method of claim 1, wherein the satellite navigation receiver determines the position without receiving aiding information from a remote server.

3. The method of claim 1, wherein the local database includes an ephemeris table for a plurality of satellites, the ephemeris table comprising stored broadcast ephemeris and almanac, satellite clock parameters, computed satellite initial parameters, satellite perturbation force parameters, and UTC and GPS time.

4. The method of claim 1, further comprising updating the local database when new broadcast ephemeris is received by the receiver.

5. The method of claim 4, further comprising waking up the receiver according to a schedule for updating the local database.

6. The method of claim 5, wherein the schedule is irregular, regular, or manually set.

7. The method of claim 1, wherein the perturbation forces are estimated using a Kalman filtering algorithm.

8. The method of claim 1, further comprising computing the predicted ephemeris per a given schedule or whenever the local navigation database is updated.

9. The method of claim 1, further comprising storing the predicted ephemeris in the local navigation database.

10. The method of claim 1, wherein determining the position comprises:
using Kalman filtering or least squares estimating which takes into account prior accuracy information of the future ephemeris; and
determining a quality of the position.

11. The method of claim of 1, wherein estimating the perturbation forces includes a numerical integration on the current and historical broadcast ephemeris.

12. The receiver of claim 1, wherein the position fix module determines position by:
using Kalman filtering or least squares estimating which takes into account prior accuracy information of the predicted ephemeris; and
determining a quality of the position.

13. The receiver of 12, wherein the computation module estimates the accuracy of the computed predicted ephemeris.

14. A satellite navigation receiver, comprising:
a local navigation database for storing current and historical broadcast ephemeris received from a satellite;
a computation module for computing perturbation forces using the current and historical broadcast ephemeris from the database and for computing an initial position for the satellite using the computed perturbation forces and the current and historical broadcast ephemeris and for generating a predicted ephemeris based on the computed perturbation forces and the computed initial position; and
a position fix module for determining a position for the satellite navigation receiver using the predicted ephemeris.

15. The receiver of claim 14, wherein the satellite navigation receiver determines the position without receiving aiding information from a remote server.

16. The receiver of claim 14, wherein the local database includes an ephemeris table for a plurality of satellites the ephemeris table comprising stored broadcast ephemeris and almanac, satellite clock parameters, computed satellite initial parameters, satellite perturbation force parameters, and UTC and GPS time.

17. The receiver of claim 14, wherein the local database is updated when new broadcast ephemeris is received by the receiver.

18. The receiver of claim 17, wherein the receiver wakes up according to a schedule for updating the local database.

19. The receiver of claim 18, wherein the schedule is irregular, regular, or manually set.

20. The receiver of claim 14, wherein the computation module computes the perturbation forces and the initial position by:
numerically integrating the current and historical broadcast ephemeris.

21. The receiver of claim 17, wherein the computation module computes the predicted ephemeris per a given schedule or whenever the local navigation database is updated.

22. The receiver of claim 14, wherein the computation module stores the predicted ephemeris in the local navigation database.

* * * * *